(12) United States Patent
Fan et al.

(10) Patent No.: US 11,034,424 B2
(45) Date of Patent: Jun. 15, 2021

(54) GAS-ELECTRIC PARALLEL-SERIAL HYBRID MARINE POWER TRAIN SYSTEM WITH LNG COOLING

(71) Applicant: Harbin Engineering University, Harbin (CN)

(72) Inventors: Liyun Fan, Harbin (CN); Zhaohui Xiao, Harbin (CN); Chao Xu, Harbin (CN); Yaowen Lu, Harbin (CN); Hengxi Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 16/801,346

(22) Filed: Feb. 26, 2020

(65) Prior Publication Data

US 2020/0277035 A1    Sep. 3, 2020

(30) Foreign Application Priority Data

Feb. 28, 2019    (CN) .......................... 201910149823.3

(51) Int. Cl.
*B63H 21/20* (2006.01)
*B63H 21/17* (2006.01)
*B63H 21/38* (2006.01)

(52) U.S. Cl.
CPC ............ *B63H 21/20* (2013.01); *B63H 21/17* (2013.01); *B63H 21/38* (2013.01); *B63H 2021/202* (2013.01)

(58) Field of Classification Search
CPC ........ B63H 21/20; B63H 21/17; B63H 21/38; B63H 2021/202
See application file for complete search history.

(56) References Cited

U.S. PATENT DOCUMENTS

| 2005/0172880 | A1* | 8/2005 | Laurilehto | B63B 35/28 114/260 |
| 2007/0044938 | A1* | 3/2007 | Farley | B60K 11/02 165/41 |
| 2009/0215328 | A1* | 8/2009 | Daffey | B63H 23/12 440/1 |
| 2014/0102104 | A1* | 4/2014 | Read | B63H 21/21 60/718 |
| 2016/0252030 | A1* | 9/2016 | Hagiwara | F02D 41/0027 123/253 |

* cited by examiner

*Primary Examiner* — Stephen P Avila
(74) *Attorney, Agent, or Firm* — Arent Fox LLP; Michael Fainberg

(57) ABSTRACT

An object of the present disclosure is to provide a gas-electric parallel-serial hybrid marine power train system with LNG cooling, including a gas engine, an electric generator, a motor, a natural gas storage supplier. The gas engine is connected to the shaft belt motor through a gearbox, the motor is connected to the gearbox through a clutch, propellers are connected to the motor, and an engine cooling system and a fuel cell cooling system are connected to an LNG vaporization heat exchange apparatus; the electrical energy sources are the fuel cell, the electric generator and a storage battery. The arrangement of multiple power sources according to the present disclosure can meet ship requirements under various environments and circumstances, improve operating efficiencies of the gas engine, the shaft belt motor and the electric motor.

8 Claims, 1 Drawing Sheet

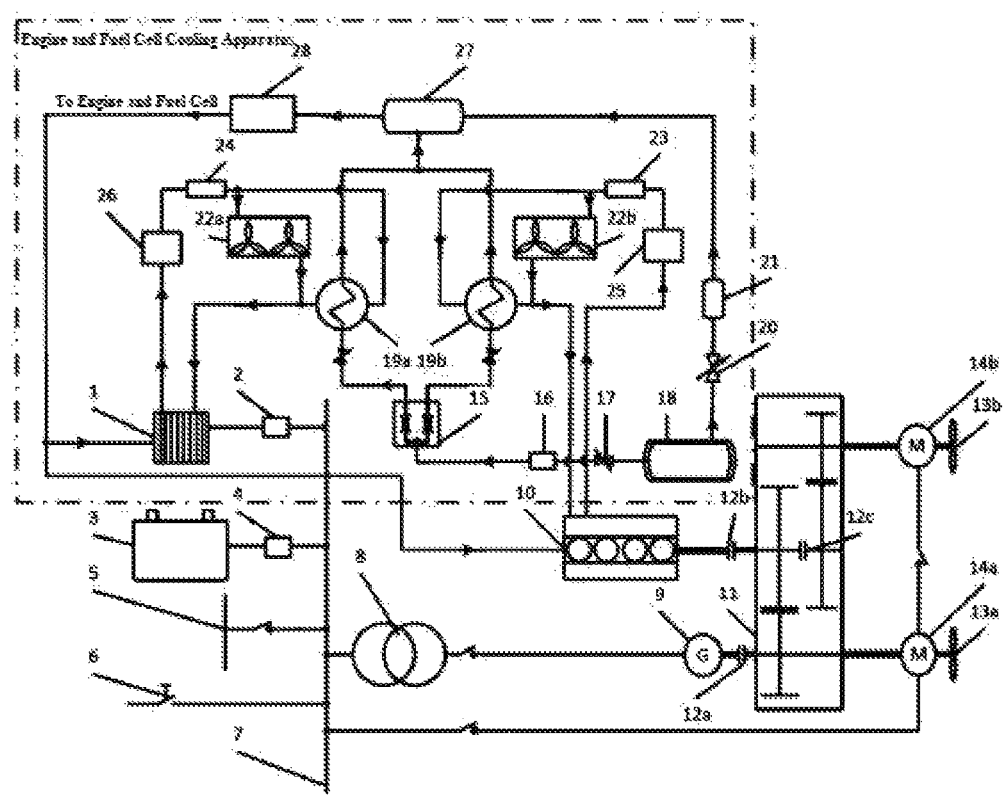

GAS-ELECTRIC PARALLEL-SERIAL HYBRID MARINE POWER TRAIN SYSTEM WITH LNG COOLING

CROSS-REFERENCE TO RELATED APPLICATIONS

This application claims priority to Chinese Patent Application No. 201910149823.3 filed on Feb. 28, 2019, the entire contents of which is hereby incorporated by reference.

TECHNICAL FIELD

The present disclosure relates to a marine power train system, in particular to a hybrid marine power train system.

BACKGROUND

The rapid rise in international oil prices and the implementation of more stringent emission regulations have put higher requirements on the economic efficiency and emission efficiency of ships. Energy conservation and emission reduction have become an important task in the development of the national economy. Ships are high energy consumption transportation vehicles, and their energy-saving and emission-reduction technologies have become one of the hot spots for everyone's attention and research.

Natural gas as a fuel of the engine is an inevitable trend in the development of marine engines in the future. Natural gas has the advantages of being environmentally friendly, economic efficient, safe and reliable. Fuel cell, as a power generation device with high power generation efficiency, low environmental pollution, high specific energy, low noise, high reliability, and easy construction, is a new direction for the advancement of electric marine power train in the future. In order to facilitate its storage and transportation, natural gas is often compressed and cooled down to a liquid, LNG (Liquefied Natural Gas). When used, LNG absorbs heat and vaporizes into a gas. During vaporization, LNG releases about 840 kJ/kg of cold energy, which, if directly released into the environment, will cause energy waste. During the operation of the engine and fuel cell, only less than 50% of the chemical energy released by the fuel is used for work; most of the rest of the energy is discharged into the atmosphere in the form of thermal energy. And because the heat flux density is too high, the engine and fuel cell often need an additional cooling system, which adds additional energy consumption and fuel consumption.

Full electric marine propulsion system is the forefront of future marine technology research and has the advantages of good economic efficiency, maneuverability, safety, low noise and low pollution. However, due to the power generation methods, power density and energy storage technology, full electric ships at this stage cannot achieve high speed, acceleration and self-control, and their cruising range is limited by the cell capacity.

Hybrid ships have the advantages of both internal combustion engine propulsion ships and full electric propulsion ships. Compared with internal combustion engine propulsion ships, hybrid ships can change their working mode according to the load, to ensure oil efficiency in all operating conditions, and improve redundancy. Compared with full electric propulsion ships, hybrid ships require lower initial investment costs and produce strong endurance. Hybrid marine power train technology solves the problem between energy saving and technology readiness, realizing high efficiency of fuel and at the same time utilizing LNG vaporization cold energy to further improve the efficiency of fuel use, thereby providing a practical solution for the transformation from traditional mechanical propulsion to full electric propulsion. Therefore, developing hybrid ships is of great importance.

SUMMARY

An object of the present disclosure is to provide a gas-electric parallel-serial hybrid marine power train system with LNG cooling, which uses LNG vaporization cold energy, further reduce fuel consumption and improve economic efficiency and emission efficiency.

The object of the present disclosure is realized as follows.

The present disclosure includes a gas-electric parallel-serial hybrid marine power train system with LNG cooling, characterized by: including a gas engine, a gearbox, an electric generator and an LNG liquid storage tank, wherein the electric generator is connected to the gearbox through a first clutch; the gas engine is connected to the gearbox through a second clutch; the gearbox has an output end connected to a first motor and a second motor respectively; the first motor is connected to a first propeller and the second motor is connected to a second propeller; the LNG liquid storage tank has a first output connected to a BOG tank and then a surge tank; the LNG liquid storage tank has a second output connected to a splitter through a stop valve and an LNG pump; the splitter has an output connected to a first LNG vaporization heat exchange apparatus and a second LNG vaporization heat exchange apparatus respectively; a first output of the first LNG vaporization heat exchange apparatus and a first output of the second LNG vaporization heat exchange apparatus are both connected to the surge tank; the surge tank has an output connected through a dryer to a fuel cell and the gas engine respectively; a gas engine coolant output is connected to an engine coolant expansion tank; the engine coolant expansion tank is connected to a second dissipator and a second LNG vaporization heat exchange apparatus respectively, which then lead the coolant to return to the gas engine; the fuel cell has a coolant output connected to a fuel cell coolant expansion tank; the fuel cell coolant expansion tank is connected to a first heat dissipator and a first LNG vaporization heat exchange apparatus respectively, which lead the coolant to return to the fuel cell; the fuel cell, a storage battery, and the electric generator are connected to a ship power grid; the gearbox includes four gears: the first gear is engaged with the second gear, the third gear is engaged with the fourth gear, the first gear is connected to the first clutch, the second gear is connected to the second clutch, the second gear is connected with the third gear through a third clutch, the first gear has a shaft connected to the first propeller, the fourth gear has a shaft connected to the second propeller.

The present disclosure may also include:

1. In a mechanical propulsion mode, the mechanical propulsion mode being: gas engine propulsion mode, gas engine+electric generator propulsion mode.

Gas engine propulsion mode: the first clutch is disengaged, the second and third clutches are engaged, the first and second motors are shut off; LNG goes from the LNG liquid storage tank through the stop valve, the LNG pump and the splitter to the second LNG vaporization heat exchange apparatus, which performs heat exchange on some of the gas engine coolant; another part of the coolant is cooled by the second heat dissipator.

Gas engine+electric generator propulsion mode: the first, second and third clutches are engaged, the first and second motors are shut off, the gas engine powers both the first and second propellers and the electric generator, and the electrical energy generated by the electric generator is transmitted to the ship power grid to charge the storage battery; LNG goes from the LNG liquid storage tank through the stop valve, the LNG pump and the splitter to the second LNG vaporization heat exchange apparatus, which performs heat exchange on some of the gas engine coolant; another part of the coolant is cooled by the second heat dissipator.

2. In an electric propulsion mode, the electric power propulsion mode being: fuel cell propulsion mode, storage battery propulsion mode, hybrid power supply propulsion mode, and shore power charging mode.

Fuel cell propulsion mode: the first and second clutches are disengaged and the third clutch is engaged, and the first and second propellers are powered by the first and second motors respectively, the electrical energy required by the first and second motors is provided by the fuel cell after being transmitted to the ship power grid; or, the third clutch is disengaged, and the first and second motors drive at different speeds, causing the ship to change its course; LNG goes from the LNG liquid storage tank through the stop valve, the LNG pump and the splitter to the first LNG vaporization heat exchange apparatus, which performs heat exchange on some of the fuel cell coolant; another part of the fuel cell coolant is cooled by the first heat dissipator.

Storage battery propulsion mode: the first and second clutches are disengaged and the third clutch is engaged, and the first and second propellers are powered by the first and second motors respectively, the electrical energy required by the first and second motors is provided by the storage battery after being transmitted to the ship power grid; or, the third clutch is disengaged, and the first and second motors drive at different speeds, causing the ship to change its course.

Hybrid power supply propulsion mode: the first and second clutches are disengaged and the third clutch is engaged, and the first and second propellers are powered by the first and second motors respectively, the electrical energy required by the first and second motors is provided by the fuel cell and the storage battery after being transmitted to the ship power grid; or, the third clutch is disengaged, and the first and second motors drive at different speeds, causing the ship to change its course; LNG goes from the LNG liquid storage tank through the stop valve, the LNG pump and the splitter to the first LNG vaporization heat exchange apparatus, which performs heat exchange on some of the fuel cell coolant; another part of the fuel cell coolant is cooled by the first heat dissipator.

Shore power charging mode: the storage battery is charged by an external power supply through a shore power charging apparatus.

3. In a hybrid propulsion mode, the hybrid propulsion mode being: gas engine and single motor propulsion mode, gas engine and dual motor propulsion mode, gas engine and single motor with auxiliary power generation propulsion mode, and gas engine and dual motor with auxiliary power generation propulsion mode.

Gas engine and single motor propulsion mode: the first clutch is disengaged and the second and third clutches are engaged, the first or second motor is shut off; the gas engine and the second motor, or the gas engine and the first motor, jointly power the first and second propellers; the electrical energy required by the first and or second motor is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

Gas engine and dual motor propulsion mode: the first clutch is disengaged and the second and third clutches are engaged, the first and second motors are turned on; the gas engine and the first and second motors jointly power the first and second propellers; the electrical energy required by the first or and second motors is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

Gas engine and single motor with auxiliary power generation propulsion mode: the first, second and third clutches are engaged, the first or second motor is turned on, and the gas engine and the second motor, or the gas engine and the first motor, jointly power the first and second propellers; the gas engine also powers the electric generator, and the electrical energy generated by the electric generator is transmitted to the ship power grid to charge the storage battery or to power the second or first motor; the electrical energy required by the second or first motor is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

Gas engine and dual motor with auxiliary power generation propulsion mode: the first, second and third clutches are engaged, the first and second motors are turned on, and the gas engine and the first and second motors jointly power the first and second propellers; the gas engine also powers the electric generator, and the electrical energy generated by the electric generator is transmitted to the ship power grid to charge the storage battery or to power the first and second motors; the electrical energy required by the first and second motors is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

Advantages of the present disclosure include:

1. The present disclosure provides parallel-serial hybrid marine power train system with LNG vaporization-based engine and fuel cell cooling, includes a gas engine, an electric generator and a motor, has a wide power coverage, can meet ship requirements under various circumstances, allows the gas engine and the motor to work in their high efficiency zones, reducing fuel consumption by the engine, improving the economic efficiency and emission efficiency of ships, and effectively improves the dynamic response of the ships in their sailing, enhancing ship acceleration, deceleration and reversing performance.

2. The storage battery enables peak regulation and valley reduction, which can balance the ship load. The storage battery provides electrical energy during high power demand, and recharges itself when less electrical energy is needed, which ensures efficient engine operation and reduces the installed power. The storage battery can also be charged from an onshore power grid, which reduces fuel consumption and emissions. The storage battery can be a backup power in the event of a diesel generator failure.

3. The arrangement of multiple power sources improves the reliability and applicability of the ship. Through the engagement and disengagement of each clutch, the hybrid power train system provided by the present disclosure can achieve multiple operating modes, effectively improving the efficiency of the hybrid power train system. A suitable operating mode can be selected according to an actual power requirement or navigation environment of the ship.

4. LNG vaporization cold energy is used to cool the gas engine and the fuel cell, reducing the energy consumption of the coolant circulation pump and dissipator fans for the gas engine and fuel cell, further reducing energy consumption, increasing the EEDI level, improving the economic efficiency and emission efficiency of ship.

5. By use of the hybrid marine power train system provided by the present disclosure, it is no longer needed to arrange an auxiliary diesel engine for power generation. The electrical energy required by the ship load can be mainly provided by the fuel cell and the shaft belt motor, and in emergencies, by a storage battery, which effectively reduce occupied cabin space and lower initial investment costs.

BRIEF DESCRIPTION OF THE DRAWINGS

FIG. 1 is a structural diagram illustrating the present disclosure.

DETAILED DESCRIPTION OF EXAMPLE EMBODIMENTS

The embodiments of the present disclosure will be described in detail below with reference to the accompanying drawing.

As shown in FIG. 1, the present disclosure includes a hybrid marine power train system with parallel-serial connected LNG engine with vaporization-based cooling and fuel cell, including: a fuel cell 1, a fuel cell conversion apparatus 2, a storage battery 3, a storage battery conversion apparatus 4, a ship load 5, a shore power charging apparatus 6, a ship power grid 7, an electric generator conversion apparatus 8, an electric generator 9, an LNG engine 10, a gearbox 11, clutches 12a, 12b and 12c, propellers 13a and 13b, motors 14a and 14b, a splitter 15, an LNG pump 16, a stop valve 17, an LNG liquid storage tank 18, an LNG vaporization cold energy heat exchange apparatus 19, a gas valve 20, a BOG gas tank 21, heat dissipators 22a and 22b, an engine coolant expansion tank 23, a fuel cell coolant expansion tank 24, a surge tank 27, and a gas filtering and drying apparatus 28. The connections are as follows. The electric generator 9 is connected to the gearbox 11 through the clutch 12a; the gas engine 10 is connected to the gearbox 11 through the clutch 12b; the gearbox 11 has an output end connected to the motors 14a and 14b; and the motors 14a and 14b are connected directly to the propellers 13a and 13b. The LNG tank 18 is connected to the BOG tank 21 through the gas valve 20 to transfer BOG to the surge tank 27. LNG goes from the LNG tank 18 through the stop valve 17 and the LNG pump 16, and is carried to the LNG vaporization heat exchange apparatuses 19a and 19b by the splitter 15; vaporized LNG goes to the surge tank 27, and then the filtering and drying apparatus 28, to the fuel cell 1 and the gas engine 10. Gas engine coolant flows from the gas engine 10 to the expansion tank 23, and then splits and goes through the heat dissipator 22b and the LNG vaporization heat exchange apparatus 19b, and then returns to the gas engine 10. Fuel cell coolant flows from the fuel cell 1 to the expansion tank 24, and then splits and goes through the heat dissipator 22a and the LNG vaporization heat exchange apparatus 19a, and then returns to the fuel cell 1.

In this embodiment, the gas engine 10 is preferably a natural gas engine, and the shaft generator 9 is preferably a permanent magnet motor with high efficiency, high power density, and long lifespan; the fuel cell 1 is preferably a solid oxide fuel cell that directly uses natural gas as a fuel; the storage battery 3 is preferably a lithium iron phosphate battery with high power density and small dimensional weight. The LNG vaporization heat exchange apparatuses 19a and 19b are preferably ultra-low temperature resistant heat exchangers with multi-stage cold energy heat exchange, and are equipped with an ultra-low temperature resistant refrigerant.

The present disclosure provides operating modes including: a mechanical propulsion mode, an electric propulsion mode, and a hybrid propulsion mode.

1. Mechanical Propulsion Mode

The mechanical propulsion mode may be: gas engine propulsion mode, gas engine+electric generator propulsion mode.

Gas engine propulsion mode: In this operating mode, the clutch 12a is disengaged, the clutches 12b and 12c are engaged, the motors 14a and 14b are shut off, and the propellers 13a are 13b are powered solely by the gas engine 10. LNG goes from the LNG tank 18 through the stop valve 17, the LNG pump 16 and the splitter 15 to the LNG vaporization heat exchange apparatus 19b, which performs heat exchange on some of the gas engine coolant; another part of the coolant is cooled by the heat dissipator 22b.

Gas engine+electric generator propulsion mode: In this operating, the clutches 12a, 12b, 12c are engaged, the motors 14a and 14b are shut off, the gas engine 10 powers both the propellers 13a and 13b and the electric generator 9, and the electrical energy generated by the electric generator 9 is transmitted to the ship power grid 7 via the conversion apparatus 8 and then to the storage battery 3 via the conversion apparatus 4 for charging. LNG goes from the LNG tank 18 through the stop valve 17, the LNG pump 16 and the splitter 15 to the LNG vaporization heat exchange apparatus 19b, which performs heat exchange on some of the gas engine coolant; another part of the coolant is cooled by the heat dissipator 22b.

2. Electric Propulsion Mode

The electric power propulsion mode may be: fuel cell propulsion mode, storage battery propulsion mode, hybrid power supply propulsion mode, and shore power charging mode.

1) Fuel cell propulsion mode: In this operating mode, the clutches 12a and 12b are disengaged and the clutch 12c is engaged, and the propellers 13a and 13b are powered by the motors 14a and 14b. The electrical energy required by the motors 14a and 14b is provided by the fuel cell 1 via the conversion apparatus 2 and after being transmitted to the ship power grid 7. Or, the clutch 12c is disengaged, and the propulsion motors 14a and 14b drive at different speeds, thereby causing the ship to change its course. LNG goes from the LNG tank 18 through the stop valve 17, the LNG pump 16 and the splitter 15 to the LNG vaporization heat exchange apparatus 19a, which performs heat exchange on some of the fuel cell coolant; another part of the fuel cell coolant is cooled by the heat dissipator 22a.

2) Storage battery propulsion mode: In this operating mode, the clutches 12a and 12b are disengaged and the clutch 12c is engaged, and the propellers 13a and 13b are powered by the motors 14a and 14b. The electrical energy required by the motors 14a and 14b is provided by the storage battery 13 via the conversion apparatus 4 and after being transmitted to the ship power grid 7. Or, the clutch 12c is disengaged, and the propulsion motors 14a and 14b drive at different speeds, thereby causing the ship to change its course.

3) Hybrid power supply propulsion mode: In this operating mode, the clutches 12a and 12b are disengaged and the clutch 12c is engaged, and the propellers 13a and 13b are powered by the motors 14a and 14b. The electrical energy required by the motors 14a and 14b is provided by the fuel cell 1 and the storage battery 3 via the conversion apparatus 2 and the conversion apparatus 4 and after being transmitted to the ship power grid 7. Or, the clutch 12c is disengaged, and the propulsion motors 14a and 14b drive at different speeds, thereby causing the ship to change its course. LNG goes from the LNG tank 18 through the stop valve 17, the LNG pump 16 and the splitter 15 to the LNG vaporization heat exchange apparatus 19a, which performs heat exchange on some of the fuel cell coolant; another part of the fuel cell coolant is cooled by the heat dissipator 22a.

4) Shore power charging mode: When the ship is docked at a port or at shore, the storage battery 3 may be charged by an external power supply through the shore power charging apparatus 6.

3. Hybrid Propulsion Mode

The hybrid propulsion mode may be: gas engine and single motor propulsion mode, gas engine and dual motor propulsion mode, gas engine and single motor with auxiliary power generation propulsion mode, and gas engine and dual motor with auxiliary power generation propulsion mode.

Gas engine and single motor propulsion mode: In this operating mode, the clutch 12a is disengaged and the clutches 12b and 12c are engaged, the motor 14b (or 14a) is shut off, and the gas engine and the motor 14a (or 14b) jointly power the propellers 13a and 13b. The electrical energy required by the motor 14a (or 14b) is provided by the fuel cell 1 and the storage battery 3 (individually or collectively) via the conversion apparatus 2 and the conversion apparatus 4 and after being transmitted to the ship power grid 7. LNG goes from the LNG tank 18 through the stop valve 17, the LNG pump 16 and the splitter 15 to the LNG vaporization heat exchange apparatuses 19a and 19b, which perform heat exchange on some of the gas engine coolant and the fuel cell coolant; another part of the coolant is cooled by the heat dissipators 22a and 22b.

Gas engine and dual motor propulsion mode: In this operating mode, the clutch 12a is disengaged and the clutches 12b and 12c are engaged, the motors 14a and 14b are turned on, and the gas engine and the motors 14a and 14b jointly power the propellers 13a and 13b. The electrical energy required by the motors 14a and 14b is provided by the fuel cell 1 and the storage battery 3 (individually or collectively) via the conversion apparatus 2 and the conversion apparatus 4 and after being transmitted to the ship power grid 7. LNG goes from the LNG tank 18 through the stop valve 17, the LNG pump 16 and the splitter 15 to the LNG vaporization heat exchange apparatuses 19a and 19b, which perform heat exchange on some of the gas engine coolant and the fuel cell coolant; another part of the coolant is cooled by the heat dissipators 22a and 22b.

3) Gas engine and single motor with auxiliary power generation propulsion mode: In this operating mode, the clutches 12a, 12b and 12c are engaged, the motor 14a or 14b is turned on, and the gas engine 10 and the motor 14a or 14b jointly power the propellers 13a and 13b. The gas engine 10 also powers the electric generator 9, and the electrical energy generated by the electric generator 9 is transmitted to the ship power grid 7 via the conversion apparatus 8 and then to the storage battery 3 for charging or to the motor 14 for power supply. The electrical energy required by the motor 14a or 14b is provided by the fuel cell 1, the storage battery 3 and the electric generator 9 (individually or collectively) via the conversion apparatus 2, the conversion apparatus 4 and conversion apparatus 8 and after being transmitted to the ship power grid 7. LNG goes from the LNG tank 18 through the stop valve 17, the LNG pump 16 and the splitter 15 to the LNG vaporization heat exchange apparatuses 19a and 19b, which perform heat exchange on some of the gas engine coolant and the fuel cell coolant; another part of the coolant is cooled by the heat dissipators 22a and 22b.

4) Gas engine and dual motor with auxiliary power generation propulsion mode: In this operating mode, the clutches 12a, 12b and 12c are engaged, the motors 14a and 14b are turned on, and the gas engine and the motors 14a and 14b jointly power the propellers 13a and 13b. The gas engine 10 also powers the electric generator 9, and the electrical energy generated by the electric generator 9 is transmitted to the ship power grid 7 via the conversion apparatus 8 and then to the storage battery 3 for charging or to the motor 14 for power supply. The electrical energy required by the motors 14a and 14b is provided by the fuel cell 1, the storage battery 3 and the electric generator 9 (individually or collectively) via the conversion apparatus 2, the conversion apparatus 4 and conversion apparatus 8 and after being transmitted to the ship power grid 7. LNG goes from the LNG tank 18 through the stop valve 17, the LNG pump 16 and the splitter 15 to the LNG vaporization heat exchange apparatuses 19a and 19b, which perform heat exchange on some of the gas engine coolant and the fuel cell coolant; another part of the coolant is cooled by the heat dissipators 22a and 22b.

The mechanical propulsion mode is used when the ship leaves a port or dock and is in the sea stably cruising, or in an area with low requirements for ship emissions and noise. The electric propulsion mode is used when the ship arrives at or departs from a port or dock and accelerates, decelerates, reverses or docks; or, in an area with high requirements for ship emissions or noise. The hybrid propulsion mode is used when there is a certain degree of requirements for the propulsion power or speed of the ship.

Fuel cells have a power generation efficiency around 40%, and more than half of the chemical energy of the fuel is lost in the form of heat. When the power of a battery reaches a certain level, an additional cooling system is required. Gas engines have a maximum efficiency around 40%, and about 25% of the fuel chemical energy is lost in the cylinder in the form of thermal energy. As the design speed of the engine increases and the design requirements of its structure are strengthened, the heat flow density generated by the body is increasingly high, and the problem of heat dissipation is becoming more prominent. Fuel cells and gas engines both require heat dissipation systems, and the coolant circulation pump and the dissipator fan consume additional power. The cold energy in LNG vaporization can absorb the heat generated by fuel cells and gas engines, thereby reducing the energy consumed by the coolant circulation pump and the dissipator fan, which can then reduce the dissipation area and improve system integration level.

By use of the hybrid marine power train system with LNG cooling, it is no longer needed to arrange an auxiliary diesel engine for power generation. The electrical energy required by the ship load 5 is mainly provided by the fuel cell 1; in an operating mode with power generation, the shaft belt motor 9 may provide some of the electrical energy. In the gas engine+electric generator propulsion mode, and in the gas engine and dual motor propulsion modes, the priorities of power suppliers for the motor are as follows: electric generator>fuel cell>storage battery.

What is claimed is:

1. A gas-electric parallel-serial hybrid marine power train system with LNG cooling, comprising:
   a gas engine, a gearbox, an electric generator and an LNG liquid storage tank, wherein
   the electric generator is connected to the gearbox through a first clutch;
   the gas engine is connected to the gearbox through a second clutch;
   the gearbox has an output end connected to a first motor and a second motor respectively;
   the first motor is connected to a first propeller, and the second motor is connected to a second propeller;
   the LNG liquid storage tank has a first output connected to a BOG tank and then a surge tank;
   the LNG liquid storage tank has a second output connected to a splitter through a stop valve and an LNG pump;
   the splitter has an output connected to a first LNG vaporization heat exchange apparatus and a second LNG vaporization heat exchange apparatus respectively;
   a first output of the first LNG vaporization heat exchange apparatus and a first output of the second LNG vaporization heat exchange apparatus are both connected to the surge tank;
   the surge tank has an output connected through a dryer to a fuel cell and the gas engine respectively;
   a gas engine coolant output is connected to an engine coolant expansion tank;
   the engine coolant expansion tank is connected to a second dissipator and a second LNG vaporization heat exchange apparatus respectively, which then lead the coolant to return to the gas engine;
   the fuel cell has a coolant output connected to a fuel cell coolant expansion tank;
   the fuel cell coolant expansion tank is connected to a first heat dissipator and a first LNG vaporization heat exchange apparatus respectively, which lead the coolant to return to the fuel cell;
   the fuel cell, a storage battery, and the electric generator are connected to a ship power grid;
   the gearbox includes four gears:
   the first gear is engaged with the second gear,
   the third gear is engaged with the fourth gear,
   the first gear is connected to the first clutch,
   the second gear is connected to the second clutch,
   the second gear is connected with the third gear through a third clutch,
   the first gear has a shaft connected to the first propeller,
   the fourth gear has a shaft connected to the second propeller.

2. The gas-electric parallel-serial hybrid marine power train system with LNG cooling according to claim 1, wherein the gas-electric parallel-serial hybrid marine power train system with LNG cooling is operatable in a mechanical propulsion mode,
   the mechanical propulsion mode being: gas engine propulsion mode, gas engine+electric generator propulsion mode;
      gas engine propulsion mode: the first clutch is disengaged, the second and third clutches are engaged, the first and second motors are shut off; LNG goes from the LNG liquid storage tank through the stop valve, the LNG pump and the splitter to the second LNG vaporization heat exchange apparatus, which performs heat exchange on some of the gas engine coolant; another part of the coolant is cooled by the second heat dissipator;
      gas engine+electric generator propulsion mode: the first, second and third clutches are engaged, the first and second motors are shut off, the gas engine powers both the first and second propellers and the electric generator, and the electrical energy generated by the electric generator is transmitted to the ship power grid to charge the storage battery; LNG goes from the LNG liquid storage tank through the stop valve, the LNG pump and the splitter to the second LNG vaporization heat exchange apparatus, which performs heat exchange on some of the gas engine coolant; another part of the coolant is cooled by the second heat dissipator.

3. The gas-electric parallel-serial hybrid marine power train system with LNG cooling according to claim 1, wherein the gas-electric parallel-serial hybrid marine power train system with LNG cooling is operatable in an electric propulsion mode,
   the electric power propulsion mode being: fuel cell propulsion mode, storage battery propulsion mode, hybrid power supply propulsion mode, and shore power charging mode;
      fuel cell propulsion mode: the first and second clutches are disengaged and the third clutch is engaged, and the first and second propellers are powered by the first and second motors respectively, the electrical energy required by the first and second motors is provided by the fuel cell after being transmitted to the ship power grid; or, the third clutch is disengaged, and the first and second motors drive at different speeds, causing the ship to change its course; LNG goes from the LNG liquid storage tank through the stop valve, the LNG pump and the splitter to the first LNG vaporization heat exchange apparatus, which performs heat exchange on some of the fuel cell coolant; another part of the fuel cell coolant is cooled by the first heat dissipator;
      storage battery propulsion mode: the first and second clutches are disengaged and the third clutch is engaged, and the first and second propellers are powered by the first and second motors respectively, the electrical energy required by the first and second motors is provided by the storage battery after being transmitted to the ship power grid; or, the third clutch is disengaged, and the first and second motors drive at different speeds, causing the ship to change its course;
      hybrid power supply propulsion mode: the first and second clutches are disengaged and the third clutch is engaged, and the first and second propellers are powered by the first and second motors respectively, the electrical energy required by the first and second motors is provided by the fuel cell and the storage battery after being transmitted to the ship power grid; or, the third clutch is disengaged, and the first and second motors drive at different speeds, causing the ship to change its course; LNG goes from the LNG liquid storage tank through the stop valve, the LNG pump and the splitter to the first LNG vaporization heat exchange apparatus, which performs heat exchange on some of the fuel cell coolant; another part of the fuel cell coolant is cooled by the first heat dissipator;

shore power charging mode: the storage battery is charged by an external power supply through a shore power charging apparatus.

4. The gas-electric parallel-serial hybrid marine power train system with LNG cooling according to claim 2, wherein the gas-electric parallel-serial hybrid marine power train system with LNG cooling is operatable in an electric propulsion mode, the electric power propulsion mode being: fuel cell propulsion mode, storage battery propulsion mode, hybrid power supply propulsion mode, and shore power charging mode;

fuel cell propulsion mode: the first and second clutches are disengaged and the third clutch is engaged, and the first and second propellers are powered by the first and second motors respectively, the electrical energy required by the first and second motors is provided by the fuel cell after being transmitted to the ship power grid; or, the third clutch is disengaged, and the first and second motors drive at different speeds, causing the ship to change its course; LNG goes from the LNG liquid storage tank through the stop valve, the LNG pump and the splitter to the first LNG vaporization heat exchange apparatus, which performs heat exchange on some of the fuel cell coolant; another part of the fuel cell coolant is cooled by the first heat dissipator;

storage battery propulsion mode: the first and second clutches are disengaged and the third clutch is engaged, and the first and second propellers are powered by the first and second motors respectively, the electrical energy required by the first and second motors is provided by the storage battery after being transmitted to the ship power grid; or, the third clutch is disengaged, and the first and second motors drive at different speeds, causing the ship to change its course;

hybrid power supply propulsion mode: the first and second clutches are disengaged and the third clutch is engaged, and the first and second propellers are powered by the first and second motors respectively, the electrical energy required by the first and second motors is provided by the fuel cell and the storage battery after being transmitted to the ship power grid; or, the third clutch is disengaged, and the first and second motors drive at different speeds, causing the ship to change its course; LNG goes from the LNG liquid storage tank through the stop valve, the LNG pump and the splitter to the first LNG vaporization heat exchange apparatus, which performs heat exchange on some of the fuel cell coolant; another part of the fuel cell coolant is cooled by the first heat dissipator;

shore power charging mode: the storage battery is charged by an external power supply through a shore power charging apparatus.

5. The gas-electric parallel-serial hybrid marine power train system with LNG cooling according to claim 1, wherein the gas-electric parallel-serial hybrid marine power train system with LNG cooling is operatable in a hybrid propulsion mode, the hybrid propulsion mode being: gas engine and single motor propulsion mode, gas engine and dual motor propulsion mode, gas engine and single motor with auxiliary power generation propulsion mode, and gas engine and dual motor with auxiliary power generation propulsion mode;

gas engine and single motor propulsion mode: the first clutch is disengaged and the second and third clutches are engaged, the first or second motor is shut off; the gas engine and the second motor, or the gas engine and the first motor, jointly power the first and second propellers; the electrical energy required by the first or second motor is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor propulsion mode: the first clutch is disengaged and the second and third clutches are engaged, the first and second motors are turned on; the gas engine and the first and second motors jointly power the first and second propellers; the electrical energy required by the first and second motors is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and single motor with auxiliary power generation propulsion mode: the first, second and third clutches are engaged, the first or second motor is turned on, and the gas engine and the second motor, or the gas engine and the first motor, jointly power the first and second propellers; the gas engine also powers the electric generator, and the electrical energy generated by the electric generator is transmitted to the ship power grid to charge the storage battery or to power the second or first motor; the electrical energy required by the second or first motor is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor with auxiliary power generation propulsion mode: the first, second and third clutches are engaged, the first and second motors are turned on, and the gas engine and the first and second motors jointly power the first and second propellers; the gas engine also powers the electric generator, and the electrical energy generated by the electric generator is transmitted to the ship power grid to charge the storage battery or to power the first and second motors; the electrical energy required by the first and second motors is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

6. The gas-electric parallel-serial hybrid marine power train system with LNG cooling according to claim 2, wherein the gas-electric parallel-serial hybrid marine power train system with LNG cooling is operatable in a hybrid propulsion mode, the hybrid propulsion mode being: gas engine and single motor propulsion mode, gas engine and dual motor propulsion mode, gas engine and single motor with auxiliary power generation propulsion mode, and gas engine and dual motor with auxiliary power generation propulsion mode;

gas engine and single motor propulsion mode: the first clutch is disengaged and the second and third clutches are engaged, the first or second motor is shut off; the gas engine and the second motor, or the gas engine and the first motor, jointly power the first and second propellers; the electrical energy required by the first or second motor is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor propulsion mode: the first clutch is disengaged and the second and third clutches are engaged, the first and second motors are turned on; the gas engine and the first and second motors jointly power the first and second propellers; the electrical energy required by the first and second motors is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and single motor with auxiliary power generation propulsion mode: the first, second and third clutches are engaged, the first or second motor is turned on, and the gas engine and the second motor, or the gas engine and the first motor, jointly power the first and second propellers; the gas engine also powers the electric generator, and the electrical energy generated by the electric generator is transmitted to the ship power grid to charge the storage battery or to power the second or first motor; the electrical energy required by the second or first motor is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor with auxiliary power generation propulsion mode: the first, second and third clutches are engaged, the first and second motors are turned on, and the gas engine and the first and second motors jointly power the first and second propellers; the gas engine also powers the electric generator, and the electrical energy generated by the electric generator is transmitted to the ship power grid to charge the storage battery or to power the first and second motors; the electrical energy required by the first and second motors is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

7. The gas-electric parallel-serial hybrid marine power train system with LNG cooling according to claim 3, wherein the gas-electric parallel-serial hybrid marine power train system with LNG cooling is operatable in a hybrid propulsion mode, the hybrid propulsion mode being: gas engine and single motor propulsion mode, gas engine and dual motor propulsion mode, gas engine and single motor with auxiliary power generation propulsion mode, and gas engine and dual motor with auxiliary power generation propulsion mode;

gas engine and single motor propulsion mode: the first clutch is disengaged and the second and third clutches are engaged, the first or second motor is shut off; the gas engine and the second motor, or the gas engine and the first motor, jointly power the first and second propellers; the electrical energy required by the first or second motor is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor propulsion mode: the first clutch is disengaged and the second and third clutches are engaged, the first and second motors are turned on; the gas engine and the first and second motors jointly power the first and second propellers; the electrical energy required by the first and second motors is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and single motor with auxiliary power generation propulsion mode: the first, second and third clutches are engaged, the first or second motor is turned on, and the gas engine and the second motor, or the gas engine and the first motor, jointly power the first and second propellers; the gas engine also powers the electric generator, and the electrical energy generated by the electric generator is transmitted to the ship power grid to charge the storage battery or to power the second or first motor; the electrical energy required by the second or first motor is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor with auxiliary power generation propulsion mode: the first, second and third clutches are engaged, the first and second motors are turned on, and the gas engine and the first and second motors jointly power the first and second propellers; the gas engine also powers the electric generator, and the electrical energy generated by the electric generator is transmitted to the ship power grid to charge the storage battery or to power the first and second motors; the electrical energy required by the first and second motors is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

8. The gas-electric parallel-serial hybrid marine power train system with LNG cooling according to claim 4, wherein the gas-electric parallel-serial hybrid marine power train system with LNG cooling is operatable in a hybrid propulsion mode, the hybrid propulsion mode being: gas engine and single motor propulsion mode, gas engine and dual motor propulsion mode, gas engine and single motor with auxiliary power generation propulsion mode, and gas engine and dual motor with auxiliary power generation propulsion mode;

gas engine and single motor propulsion mode: the first clutch is disengaged and the second and third clutches are engaged, the first or second motor is shut off; the gas engine and the second motor, or the gas engine and the first motor, jointly power the first and second propellers; the electrical energy required by the first or second motor is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor propulsion mode: the first clutch is disengaged and the second and third clutches are engaged, the first and second motors are turned on; the gas engine and the first and second motors jointly power the first and second propellers; the electrical energy required by the first and second motors is provided by the fuel cell and the storage battery, individually or collectively, after being transmitted to the ship power grid; LNG goes from the LNG liquid storage tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and single motor with auxiliary power generation propulsion mode: the first, second and third clutches are engaged, the first or second motor is turned on, and the gas engine and the second motor, or the gas engine and the first motor, jointly power the first and second propellers; the gas engine also powers the electric generator, and the electrical energy generated by the electric generator is transmitted to the ship power grid to charge the storage battery or to power the second or first motor; the electrical energy required by the second or first motor is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators;

gas engine and dual motor with auxiliary power generation propulsion mode: the first, second and third clutches are engaged, the first and second motors are turned on, and the gas engine and the first and second motors jointly power the first and second propellers; the gas engine also powers the electric generator, and the electrical energy generated by the electric generator is transmitted to the ship power grid to charge the storage battery or to power the first and second motors; the electrical energy required by the first and second motors is provided by the fuel cell, the storage battery and the electric generator, individually or collectively, after being transmitted to the ship power grid; LNG goes from the LNG tank through the stop valve, the LNG pump and the splitter to the first and second LNG vaporization heat exchange apparatuses, which perform heat exchange on some of the gas engine coolant and the fuel cell coolant; another part of the coolant is cooled by the first and second heat dissipators.

* * * * *